Oct. 2, 1956

M. R. BOSWORTH 2,764,882

TOOL ADAPTER

Filed Sept. 30, 1953

INVENTOR.
MERRIL R. BOSWORTH
BY George Sipkin
B. L. Zangwill
ATTORNEYS

United States Patent Office 2,764,882
Patented Oct. 2, 1956

2,764,882
TOOL ADAPTER

Merril R. Bosworth, Linwood, Pa.

Application September 30, 1953, Serial No. 383,416

9 Claims. (Cl. 64—29)

(Granted under Title 35, U. S. Code (1952), sec. 266)

The invention described herein may be manufactured and used by or for the Government of the United States of America for governmental purposes without the payment of any royalties thereon or therefor.

The present invention relates to a tool adapter and more particularly to a tool adapter having a slip clutch for limiting the force transmitted to the tool and which provides a variable maximum torque at the tool applied to the work.

Generally, tools utilized for driving threaded members, such as screws, nuts, bolts, and the like, employ a rigid and unitary spindle structure for transmitting power from the motor to the tool and thence to the threaded member. Thus, the prior tools have been usually operatively driven so that the tool would initially drive the threaded members to the point where final tightening of the member would then be necessary. After this initial driving operation, the threaded member would have to be separately tightened or finally set by suitable manual means.

The final tightening of the threaded member would usually not take place during the initial driving operation since the torque transmitted to the member could not be sufficiently controlled to prevent the possibility of rupturing the threaded member or the unitary spindle of the tool. Hence, the driving operation and the final setting operation occurred at different time intervals and not in one continuous driving operation, thereby insuring that the applied torque did not become greater than the resisting force or torque developed after the threaded member has been set.

In accordance with the teachings of the present invention, there is provided a power actuated rotary driven tool adapter employing a power member and a tool member normally coupled for joint rotation by a releasable connection to drive and finally set a threaded member in one continuous operation. Consequently, threading operations can be conducted with greater speeds and with an operational efficiency that greatly reduces production "scraps." Also, operations connected with such a relatively simple and rugged tool would result in minimizing physical strain and fatigue.

An object of the present invention is the provision of a power actuated rotary driven tool adapter having a power driven member and a tool driving member operatively coupled for joint rotation by a connection releasable when the difference in torques between the members reaches a given value.

Another object is to provide a tool adapter having a power driven member and a tool driving member usually coupled into operative driving engagement by adjustable resilient means for providing a non-driving relation between the members when the resistance of the driven member reaches a predetermined value.

Still another object is to provide a tool adapter utilized with a plurality of tools and capable of being driven by any of a plurality of different types of power means.

An object of the present invention is the provision of a power driven tool adapter for speedy driving and complete setting of threaded members without physical fatigue to the operator.

Other objects and many of the attendant advantages of this invention will be readily appreciated as the same becomes better understood by reference to the following detailed description when considered in connection with the accompanied drawings in which like reference numerals designate like parts throughout the figures thereof and wherein.

Figure 1:
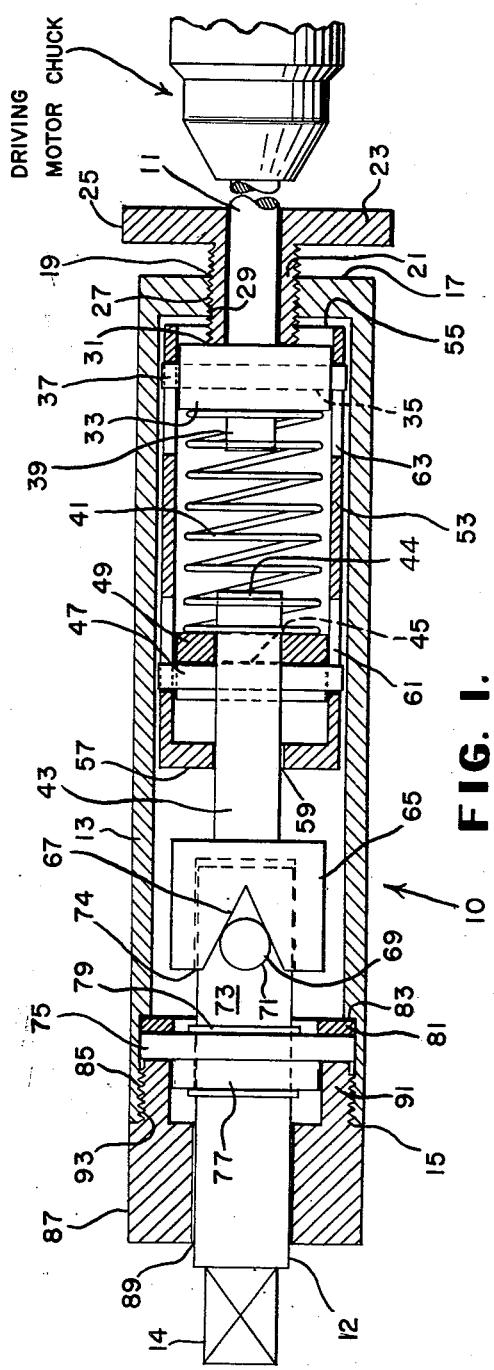
Fig. 1 is a plan view, partly in section, of a preferred embodiment of the invention.

Referring now to the drawings, there is illustrated a preferred embodiment, and a modification thereof, comprising a tubular housing with an input driving shaft and an output driven shaft adapted for mounting various size tool sockets thereon. The driving and driven shafts are operatively coupled for joint rotation by an adjustable spring-biased connection releasable when the difference in torques between the shafts reaches a given value determined by proper adjustment of the spring tension.

There is shown in Fig. 1 a preferred embodiment 10 of the invention having an input driving shaft 11 adapted to be coupled to suitable power means, such as a chuck of a hand or powered tool, and a driven shaft 12 having a snap-on adapter end 14 for mounting various size tool sockets thereon. The tool adapter 10 consists of a housing 13, preferably tubular in shape, having an open end 15 and a closed end 17 formed with an aperture 19 having an axis coinciding with the axis of the housing. The driving shaft 11 extends through the aperture 19 and is formed with a diameter substantially smaller than the diameter of said aperture, to provide sufficient space for inserting therebetween a hollow tubular sleeve 21 of a spring adjuster 23. The spring adjuster 23 is provided with an integral spring adjuster knob 25 for proper manual adjustment. The aperture 19 is provided with internal threaded portion 27 for threaded engagement with external threaded portion 29 formed on the circumferential surface of the sleeve 21.

The end face 31 of the spring adjuster 23 within the housing 13, is juxtaposed to a boss 33 integrally formed on the end of shaft 11. The boss 33 is provided with a transverse bore 35 adapted to snugly receive a driving shaft pin 37 for the purposes hereinafter discussed. The boss 33 is further provided with a radially reduced portion 39 serving as an end guide for a coil spring 41 coacting therewith. Axially spaced from the end 39 is located a clutch shaft 43 having an end 44 serving as the other end guide for the spring 41.

The clutch shaft 43 is formed, near its end 44, with a transverse bore 45 adapted to slidably receive a clutch shaft pin 47 for the purposes hereinafter discussed. A washer 49 is slidably fitted over the end 44 of the clutch shaft 43 and is formed with a diametrical slot 51 to slidably engage the clutch shaft pin 47.

The washer 49 serves as an end bearing for the spring 41, as does the boss 33 of the driving shaft 11, to maintain the spring compressed therebetween.

A torque tube 53 i. e., a tube adapted to transmit torque from one rotatable member to another, is provided concentric with the spring 41 and the shafts 11 and 43, the tube 53 having an open end 55 adjacent the end 17 of the tubular housing 13, and having an opposite end wall 57 having an aperture 59 with an axis coinciding with the axis of said shafts 11 and 43. The torque tube 53 is also formed with diametrically opposed axially extending clutch slots 61 and diametrically opposed axially extending driving slots 63. The driving slots 63 are adapted to slidably receive the ends of the driving shaft pin 37, while the clutch slots 61 are adapted to slidably receive the ends of the clutch shaft pin 47. Thus, rotation of the driving shaft 11 will be transmitted through the driving pin 37 to the torque tube 53 and then to the clutch shaft pin 47 for rotation of the clutch shaft 43, with the axially spacing of the pins 37 and 47 depending, within limits, upon the compression in spring 41.

Clutch shaft 43 protrudes through the aperture 59 provided in the torque tube's end wall 57, and is formed with a hollow protuberant clutch member 65. The clutch member 65 is adapted to serve as a hollow ratchet slip connection, as hereinafter discussed, and is provided with diametrically opposed notches 67 of suitable shape to releasably engage a driving pin 69 fixedly secured to the driven shaft 12. The driving pin 69 is within a transverse bore 71 provided on an end 73 of the driven shaft 12. The end 73 of driven or socket shaft 12 slidably fits within an axial bore 74 provided in the clutch member 65.

The driven shaft 12 is also provided with a circular bearing flange 75, of suitable bearing material such as oilite or the like, having a radially reduced boss 77. The flange 75 is axially fixed with respect to driven shaft 12 by suitable attaching means such as split rings 79 or the like. Juxtaposed to the inward facing surface of the flange 75, is a steel washer 81 bearing against a shoulder 83 formed in the hollow tubular housing 13 adjacent its open end 15. The washer 81 provides sufficient bearing surface for the flange 75 to eliminate stress concentrations thereon or on the shoulder 83.

The inner portion of the tubular housing 13, adjacent the open end 15, is provided with internal threads 85 outward from the bearing flange 75. The tubular housing's open end 15 is provided with a threaded cap 87 formed with an aperture 89 having its axis coincide with the axis of the tubular housing 13. The threaded cap is formed with an integral circular flange 91 having external threads 93 formed thereon and adapted to threadably engage threads 85 on housing 13. Thus, the driven shaft 12 is axially fixed relative to the tubular housing 13 by the coaction of the bearing flange 75 with the steel washer 81 and with the circular flange 91 of the threaded cap 87, but is free to rotate in the housing.

Figure 2:
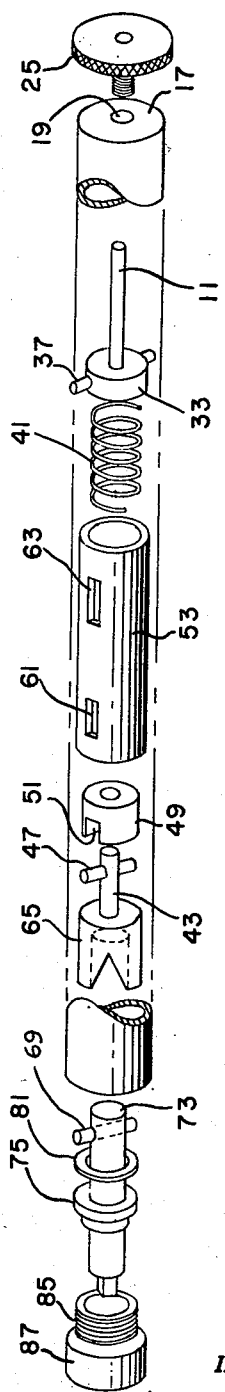
Fig. 2 is a schematic exploded view in perspective of the apparatus shown in Fig. 1.

Referring now to Fig. 2, the tool adapter is assembled by inserting the clutch shaft 43 into the torque tube 53 through the aperture 59, and then fitting the clutch shaft pin 47 through slots 61 into the bore 45. Next, the washer 49 is inserted through the open end 55 over the clutch shaft end 44 and into operative engagement with the pin 47. The coil spring 41 is inserted into the torque tube 53, through the open end 55, with one end against the washer 49. The boss 33, integral with the driving shaft 11, is inserted within the torque tube 53 against the tension force of the spring 41, and the driving shaft pin 37 is forced into the bore 35. Thus, it can be seen that the spring 41 is maintained in a compressed state between the washer 49 and the washer 33. However, the compressed status of the spring can be controlled by varying the distance between washer 49 and boss 35, as hereinafter discussed.

The assembled torque tube 53 is then inserted through the open end 15 into the tubular housing 13, so that the driving shaft 11 protrudes through the housing aperture 19. Thereupon the spring adjuster 23 is slidably fitted over the driving shaft 11 so that the threaded portion of the sleeve 21 is threadably engaged with the aperture's internal threads 27.

Thereafter, the driven shaft 12 is inserted through the open end 15 of the housing 13 so that the bearing flange 75 is juxtaposed to the steel washer 81 abutting the shoulder 83. The threaded cap 87 is then threaded to the end of the housing 13, through coaction with the threads 85, to form the complete tool adapter 10.

The assembled tool-adapter can be used by placing the shaft 11 into any suitable driving chuck. In operation, the tension of the spring 41 is properly adjusted to the desired spring tension by the manual turning of the spring adjuster 23 to axially move the washer 33 relative to the washer 49 which preferably is at or near the outer, or tool-side, edge of the slots 61 of the torque tube 53. The pressure force of the spring on washer 49 is resisted, through shaft 43, clutch members 65 and 69, shaft-end 73 and flange 75, by the housing 13. The particular adjustment of the spring tension is determined by the specific operation and tool utilized with the tool adapter 10.

In operation, driving shaft 11 rotates torque tube 53 through pin 37. Torque tube 53 rotates clutch member 65 through pins 47 and shaft 43. Clutch member 65 rotates driven shaft 12 through pin 69. If the resistance of driven shaft 12 becomes too great, the cam slots of notches 67 ride on the pin 69 until they disengage, the pin intermittently engaging and disengaging the notches without being forcibly rotated.

Figure 3:
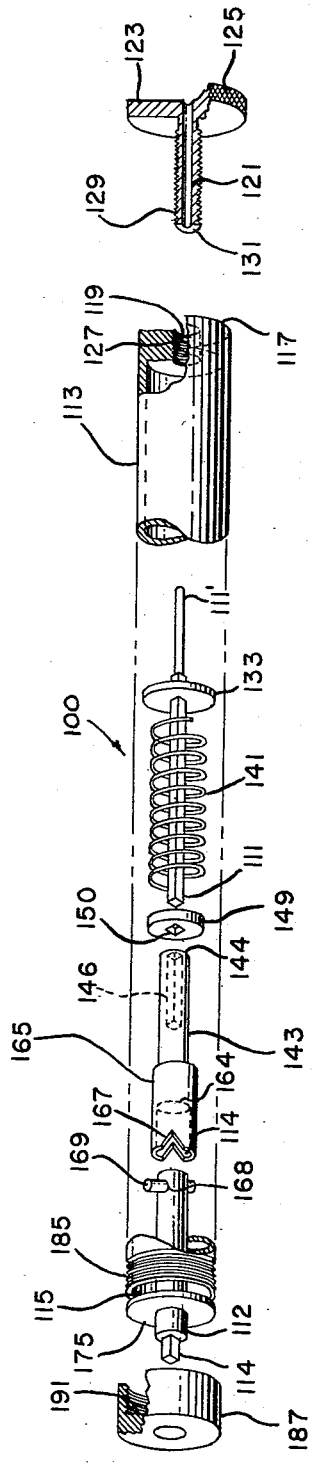
Fig. 3 is a schematic exploded view in perspective of a modification of the device shown in Fig. 1.

In Fig. 3 there is shown a tool adapter 100 which is a modification of the preferred embodiment illustrated in Fig. 1. The tool adapter 100 consists of a housing 113, preferably tubular in construction, formed with an open end 115 and a closed end 117 having an aperture 119 formed therein. The interior of the housing 113 is provided with an assembly having a driven shaft 112 with a snap-on adapter end 114 for mounting thereon various size tool sockets. Also, a bearing flange 175 is secured to said driven shaft 112 by suitable attaching means, and being juxtaposed to the end 115 of the housing 113. The driven shaft 112 is formed with a bore 168 adapted for securing therein a driving pin 169. The driving pin is provided to releasably engage cam slots 167 formed on clutch member 165. The cam slots are constructed of a suitable shape to facilitate disengagement of the driving pin 169 and the clutch member 165 at a predetermined operative condition.

The clutch member 165 is formed with a bore 164 for slidably fitting said clutch member over the end of the driven shaft 112 to enable the driving pin 169 and cam slots 167 to operatively coact and form a slip clutch type of coupling. The clutch member is provided with an integral clutch shaft 143 having an end 144 formed with a square axial bore 146. The square axial bore 146 has an axis coinciding with the axis of the housing 113. In juxtaposed relationship to the clutch end 144 is a washer 149 having a square bore 150 equal in cross-section to the square bore 146.

A driving shaft 111 is provided with an axis coinciding with the axis of the housing 113, and with a square cross-section slightly smaller than the cross-section of the bores 146 and 150. The driving shaft 111 is adapted to slidably fit through the bore 150 and into bore 146 for torque coupling therewith. A spring 141 is provided concentric with the driving shaft 111 and adapted to be retained between the washer 149 and a washer 133 slidably mounted on said shaft 111. The driving shaft 111 has a reduced circular cross-sectional portion 111' which is adapted to slidably fit through the aperture 119, in the housing's end wall 117, and is adapted to be coupled to a suitable power means.

A spring adjuster 123 is formed with a knurled knob 125 and tubular sleeve 121 provided with an external threaded portion 129. The threaded sleeve 121 is adapted to slidably fit over the circular shaft portion 111' and to threadably engage the internal threaded portion 127 in the aperture 119. Thusly, end face 131 of the spring adjuster is brought into contact with the slidably mounted washer 133 by manually threading spring adjuster 123 relative to the end wall 117. In this manner, the tension of the spring may be adjusted as deemed desirable for the specific tool utilized with the snap-on adapter 114.

The housing 113 is provided with a threaded cap 137 adapted to threadably engage an external threaded portion 185 of the housing. In this manner, the driven shaft is maintained axially fixed relative to the housing 113 by having the bearing flange 175 juxtaposed to the housing end 115 and to a flange 191 formed within the threaded cap 187.

In operation, the driving shaft 111 transmits power through the square portion slidably engaging the square bore 146 of the clutch shaft 143, to thereby rotate the clutch 165. The predetermined tension in the spring 141 bearing against the washer 149 maintains the clutch cam slots 167 operatively bearing against the driving pin 169. Thus, a threaded member can be tightened and finally threaded by means of a suitable tool socket mounted on the driven shaft's snap-on adapter end 114. In the final setting of the threaded member, if the difference in torque between the driven shaft 112 and the clutch 165 reaches a predetermined value, determined by the adjustment of the spring tension, the cammed surfaces of the clutch 165 will override the driving pin 169 to thereby intermittently disengage the driven shaft from the driving shaft 111.

Obviously, many modifications and varations are possible in the light of the above teachings, it is therefore understood, that within the scope of the appended claims the invention may be practiced otherwise than as specifically described.

What is claimed is:

1. I a device of the character described, the combination of a tubular housing having an open threaded end and a closed end, said closed end having a threaded aperture therein, a cap member having an axial bore and a threaded portion adapted to threadably engage said open threaded end, a driven shaft having a first portion within said housing and a second portion slidably fitting through said axial bore, said second portion having a tool adapter end for receiving tool sockets thereon, said first portion having a bearing flange mounted thereon to maintain said driven shaft axially fixed relative to said tubular housing by coacting with said cap member and said tubular housing, a driving pin transversely secured to the inner end of said first portion, a clutch shaft having a cam member integral therewith for releasably engaging said driving pin, a torque tube having an open tube end and a closed tube end, said closed tube end of said torque tube having an axial opening adapted to slidably receive one end of said clutch shaft, said torque tube having a first pair of diametrically opposed axial slots and a second pair of diametrically opposed axial slots, a clutch shaft pin transversely secured to said clutch shaft portion within said torque tube and having its outer ends operatively engaged with said first pair of diametrically opposed axial slots, a driving shaft within said tubular housing and having a portion thereof passing through the threaded aperture of said housing adapted to be coupled to a power source, said driving shaft having a boss member coaxial with said torque housing and slidably coacting therewith, said boss member having a driving shaft pin transversely secured thereto and adapted to operatively coact with said second pair of diametrically opposed axial slots to thereby transmit torque from said driving shaft to said torque tube and to said clutch shaft, a spring member coaxial with said torque tube and said clutch shaft and driving shaft adapted to bias said clutch shaft and driving shaft to thereby provide a releasable coupling between said driving pin and said cam member.

2. A tool adapter assembly comprising, a tubular housing, a driving shaft, and a driven shaft, both shafts being mounted in said housing and rotatable relative thereto but free of driving connection therewith, whereby said housing may be hand-held while said shafts rotate, releasable coupling means within said tubular housing for releasably coupling said driving shaft and said driven shaft, said releasable coupling means comprising a first clutch member and a second clutch member, a rotatable torque tube operatively coupled to said first clutch member and to said driving shaft, said first clutch member being spaced from and movable relative to said driving shaft, said coupling means further comprising resilient means associated with said torque tube for biasing into engagement said first clutch member and said second clutch member, said resilient means being interposed between said first clutch member and said driving shaft, whereby disengagement of said clutch members will cause movement of neither said driving shaft nor said housing.

3. A tool adapter device comprising a tubular housing, a driven shaft having one end within said housing, a first clutch member fixed to said end of the driven shaft, a driving shaft having one end within said housing, an axially slidable shaft within said housing, said slidable shaft being operably coupled to the driving shaft and adapted for axial movement between the respective inner ends of the other shafts, a second clutch member affixed to said slidable shaft and adapted to cooperate with said first clutch member, a spring member in said housing interposed between said slidable shaft and said driving shaft and biasing apart said slidable shaft and said driving shaft, whereby said driving shaft is releasably engaged with said driven shaft through said clutch members.

4. A tool adapter device comprising, an elongated tubular casing member, a first rotatable shaft associated with said casing, tool securing means fixed thereto, a second rotatable shaft entirely contained within said casing, a torque tube rotatably mounted within said casing, spring means within said torque tube and mounted between a pair of movable bearing members having slidable and driving contact with the torque tube, means on the casing abutting one of the bearing members for adjusting the tension of the spring, and means coupled to the torque tube and having a portion thereof extending from the casing said last means adapted to be coupled to a power means.

5. A tool adapter device, comprising a one piece tubular casing, a driven rotatable shaft extending from one end of said casing and adapted to be connected to a tool, a driving rotatable shaft extending from the opposite end of said casing and adapted to be coupled to a power source, clutch means comprising a fixed clutch member and an axially movable clutch member, said members being within the casing, said clutch members being adapted to releasably couple said shafts, an intermediate rotatable member coupled at one end to the driving shaft and at the other end thereof to said axially movable clutch member, resilient means comprising a coil spring adapted to maintain said clutch members in releasable contact, said spring being concentric with the intermediate member, whereby said clutch means will be disengaged upon the application of excessive torque to the driven member.

6. A tool adapter device of the type set forth in claim 5 wherein said casing member is provided at one end thereof with movable means for adjusting tension on said coil spring, said means being rotatable about said driving shaft and in frictional engagement with said casing.

7. A tool adapter device comprising a tubular housing of one piece construction, a driven shaft extending through one end thereof, a separate driving shaft extending through the other end thereof, releasable clutch means adapted to releasably couple said shafts, a rotatable torque tube in said housing between the inner extremities of said shafts, a pair of bearing members mounted within said torque tube and movable relative thereto in an axial direction only, one of said bearing members being attached to the driving shaft, and the other of said bearing members being attached to the clutch means, said bearing members being fixed against rotation relative to the torque tube whereby rotation of the driving shaft causes rotation of the driven shaft.

8. A tool adapter device as set forth in claim 7 wherein there is provided a resilient means within said torque tube, said resilient means being interposed between said bearing members and adapted to move them in opposite directions.

9. A tool adapter device as set forth in claim 8, wherein said resilient means comprises a coil spring, a rotatable member mounted concentric to said driving shaft and frictionally engaging said housing, said rotatable member being adapted to increase the tension of said coil spring.

References Cited in the file of this patent

UNITED STATES PATENTS

| | | |
|---|---|---|
| 1,769,510 | Herman | July 1, 1930 |
| 2,531,573 | Konikoff | Nov. 28, 1950 |
| 2,576,069 | Hoag et al. | Nov. 20, 1951 |

FOREIGN PATENTS

| | | |
|---|---|---|
| 554,979 | Great Britain | 1943 |
| 592,701 | Great Britain | 1947 |